United States Patent [19]
Markle

[11] Patent Number: 5,257,338
[45] Date of Patent: Oct. 26, 1993

[54] DEVICE FOR TRANSMITTING AND RETURNING LIGHT AND APPARATUS AND METHOD OF MANUFACTURE

[75] Inventor: David R. Markle, Paoli, Pa.

[73] Assignee: Biomedical Sensors, Ltd., High Wycombe, England

[21] Appl. No.: 887,457

[22] Filed: May 22, 1992

[51] Int. Cl.⁵ ............................................. G02B 6/20
[52] U.S. Cl. ............................... 385/125; 359/900
[58] Field of Search ..................... 385/14, 12, 33, 34, 385/37, 117, 119, 123; 372/6; 128/4–6; 250/227.11; 359/900

[56] References Cited

U.S. PATENT DOCUMENTS

| | | | |
|---|---|---|---|
| 4,094,578 | 6/1978 | DiVita et al. | 385/51 |
| 4,358,851 | 11/1982 | Scifres et al. | 372/6 |
| 4,707,056 | 11/1987 | Bittner | 385/123 |
| 4,744,618 | 5/1988 | Mahlein | 385/37 |
| 4,750,795 | 6/1988 | Blotekjaer | 385/24 |
| 4,846,543 | 7/1989 | Kapany et al. | 385/33 |
| 4,889,407 | 12/1989 | Markle et al. | 350/96.29 |
| 4,923,273 | 5/1990 | Taylor | 372/6 |
| 5,000,901 | 3/1991 | Iyer et al. | 385/12 |
| 5,005,576 | 4/1991 | Gunther | 128/634 |
| 5,047,208 | 9/1991 | Schweitzer et al. | 422/58 |
| 5,047,627 | 9/1991 | Yim et al. | 250/227.23 |

Primary Examiner—Rodney B. Bovernick
Assistant Examiner—John Ngo
Attorney, Agent, or Firm—Peter C. Richardson; Lawrence C. Akers; Mark Dryer

[57] ABSTRACT

A device for transmitting and returning light comprising an elongate light transmissive flexible polymer fiber with a longitudinal axis, first and second ends normal to the axis for passing light therebetween and a returner shaped and sized to fit the second end with a face positioned to return light transmitted therethrough. A method and apparatus for manufacturing the device are also disclosed.

12 Claims, 3 Drawing Sheets

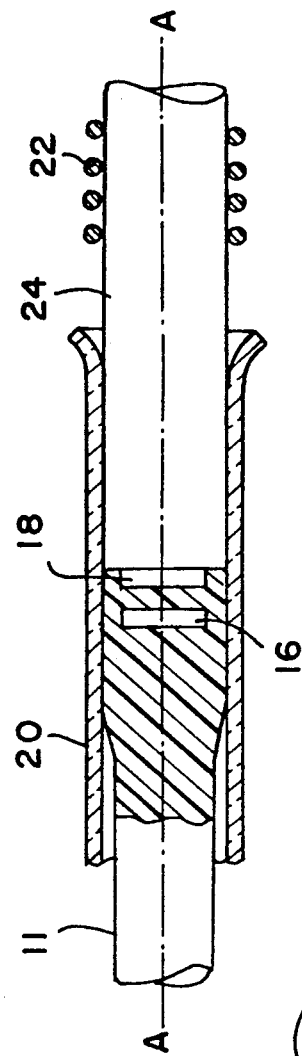
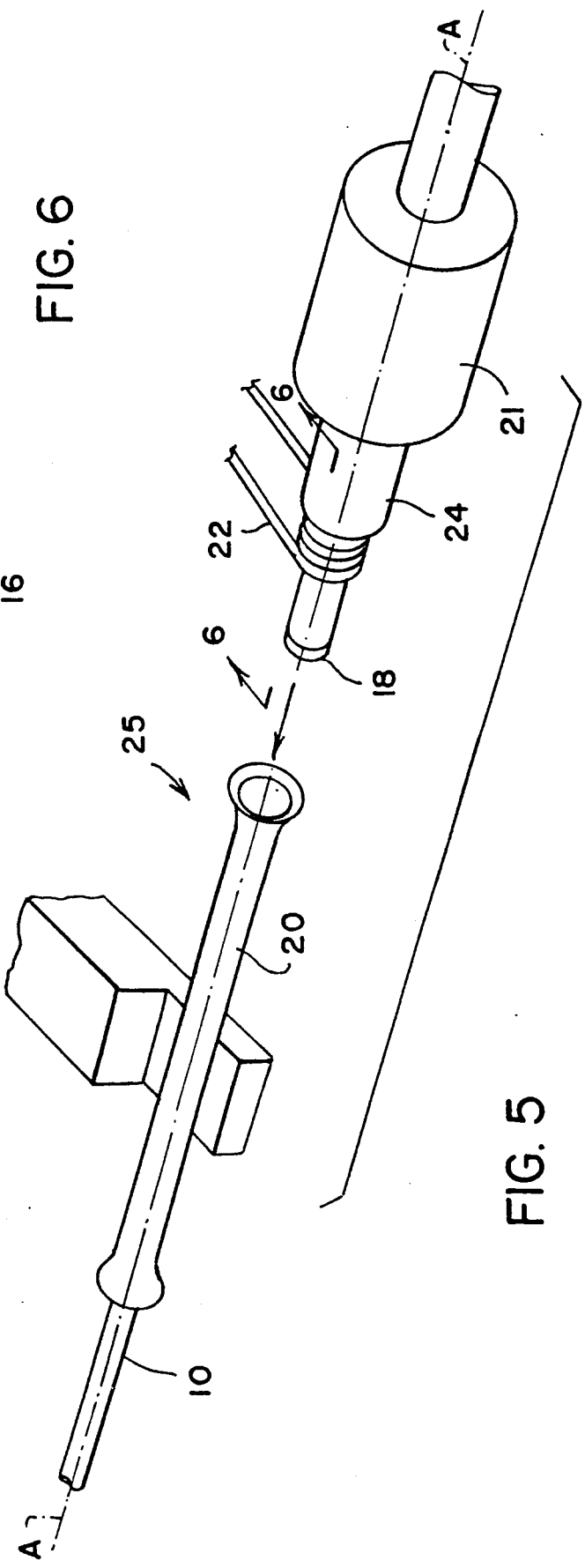

DEVICE FOR TRANSMITTING AND RETURNING LIGHT AND APPARATUS AND METHOD OF MANUFACTURE

FIELD OF THE INVENTION

This invention relates to a device for transmitting and returning light and an apparatus for and method of manufacture thereof. More particularly, a returner embedded in the end of an elongate light transmissive member made with an apparatus and by a method the aligns the returner and the elongate light transmissive member along an axis in a tube and heats and urges them together.

BACKGROUND OF THE DISCLOSURE

Described herein are device for transmitting and returning light and methods of manufacture and/or use found in the literature or practiced in the field. The literature is of interest for its teachings of the knowledge of skilled artisans at the time of this invention of device for transmitting and returning light and apparatuses for and methods of the manufacture thereof.

Specifically, U.S. Pat. No. 5,047,208 has an optical sensor for blood gas measurement with a pH sensitive absorption dye between the end of the fiber and the mirror. The mirror is located by a tube which carries the mirror spaced from and coaxially aligned with the fiber so the dye can be in the space.

U.S. Pat. No. 5,005,576 has an optical sensor for blood gas measurement capable of measuring pH, $pO_2$ and $pCO_2$ with light absorption dyes between the ends of the fibers and the mirrors. The mirrors are located in the distal end of the sheath with a silicone glue.

U.S. Pat. No. 5,047,627 has an optical sensor for blood gas measurement capable of measuring pH, $pO_2$ and $pCO_2$ with light absorption dyes between the ends of the fibers and the mirrors. The dye pellet for each fiber is attached with glue and mirrors are are not embedded in the fiber. Certainty and consistency of the optical coupling is not always repeat-able with adhesive attachment and optical efficiency is typically less than ideal. Moreover chemicals in the adherent may adversely influence the chemistry of the sensor and therefor accuracy.

U.S. Pat. No. 4,889,407 has an optical fiber with arrayed cells to substantially cover the cross sectional area of the fiber. An indicator sensitive to an analyte in a medium is used to determine pH and pCO2 in vivo in blood. That commonly assigned patent is incorporated herein by reference.

SUMMARY OF THE INVENTION

A device for transmitting and returning light preferably has an elongate light transmissive flexible member as a clad polymer fiber with a longitudinal axis with first and second ends substantially normal to its axis. The fiber passes light between the ends. The elongate light transmissive member preferably has a core of polymethylmethacrylate polymer and a cladding of fluorinated polymer.

A returner, i.e. a mirror, light emitter, fluoresor, absorber, reflector, scatter or a combination thereof, or the like preferably shaped and sized to fit the second end has a face positioned for returning substantially all of the light transmitted through the elongate light transmissive member. The returner preferably has a melting point which is substantially higher than the elongate light transmissive member and is disposed with its face normally to the axis and embedded within the second end to which it is applied. The elongate light transmissive member and the returner may each have a substantially circular cross section with its diameter about that of the elongate light transmissive member. A holder may be placed substantially parallel to the returner to secure the embedded returner at the second end and terminate the second end with polymer encapsulating the returner and the holder completing the fiber.

An apparatus for manufacturing the device for transmitting and returning light preferably has a tube with a cross sectional shape like the elongate light transmissive member and which is larger than the device for transmitting and returning light. The tube is sized internally larger than the elongate light transmissive device for permitting insertion and removal of the device for transmitting and returning light from the tube. The tube is preferably made of a relatively nonconductive material. The tube and elongate light transmissive member conjugate telescopically and are preferably circular in cross section.

The apparatus may include a means for telescopically urging the elongate light transmissive member and the returner together with the tube coaxially about the elongate light transmissive member and with the returner for placement of the returner normal to and against the second end. A heater placed about the tube, the elongate light transmissive member and the returner allows the returner to be embedded within the second end without melting or deforming the tube. A vacuum pickup holds the returner in alignment with the axis during placement on the second end.

A method for manufacturing the device for transmitting and returning light may include the step of placing the tube along the axis to receive the elongate light transmissive member for telescopic conjugation therewithin. The method may include the steps of aligning the returner along the axis with its face substantially normal thereto for placement upon the second end of the elongate light transmissive member, and telescopically urging the elongate light transmissive member and the returner together with the tube coaxially about the elongate light transmissive member and with the returner against the second end. The step of heating the tube, the elongate light transmissive member and the returner embeds the returner within the second end without melting or deforming the tube. Applying the holder with the heated vacuum pickup to the second end secures the returner.

BRIEF DESCRIPTION OF THE DRAWINGS

FIG. 5 is an exploded perspective view of an apparatus for the application of the holder during the manufacture of the device for transmitting and returning light.

FIG. 6 is a side view in partial cross section taken along the line 6—6 of FIG. 5 showing the tube, pickup and heater during assembly of the holder to the elongate light transmissive member to embed the returner.

DETAILED DESCRIPTION OF THE DRAWINGS

A device for transmitting and returning light 10 and method and apparatus for manufacture are disclosed and claimed. The claims are not limited to the structure for the device for transmitting and returning light 10 described and illustrated by way of example and the apparatus and method of manufacture specifically disclosed. The claims are to be considered in view of the existing knowledge of skilled artisans in the Field prior to the inventions defined by the language of the claims herein as amended or considered in view of knowledge of skilled artisans prior to these inventions.

Figure 1:
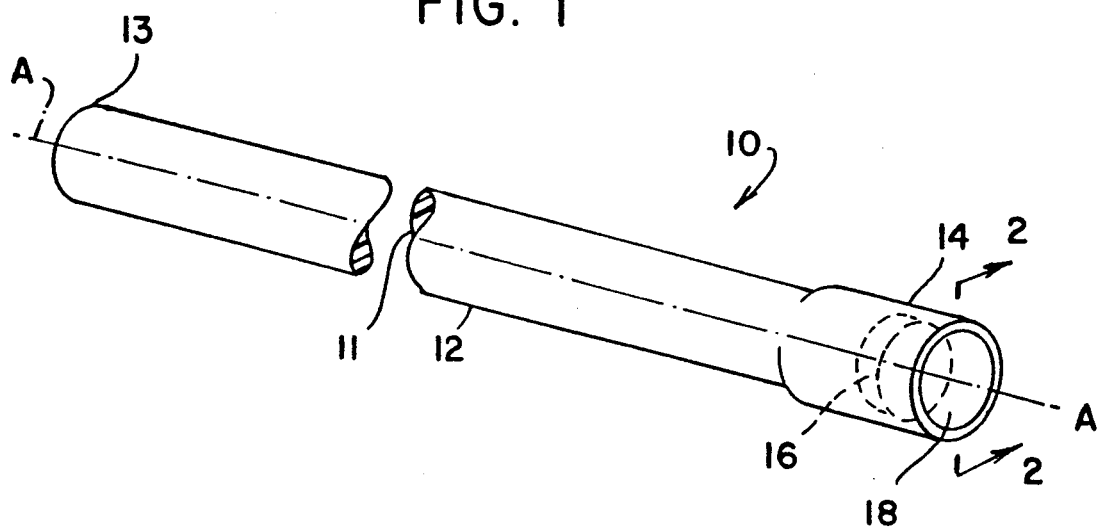
FIG. 1 is a perspective view of a device for transmitting and returning light after its manufacture.

The device for transmitting and returning light 10 has an elongate light transmissive flexible member 11 in a clad polymer 12. The elongate light transmissive flexible member 11 has a longitudinal axis "A" and a first end 13 and second end 14 that is substantially normal to its axis "A". The elongate light transmissive member 11 is of a polymer capable of passing light between the first end 13 and the second end 14. FIG. 1 is a perspective view of the device for transmitting and returning light 10. The elongate light transmissive member 11 preferably has a core 15 of polymethylmethacrylate polymer and a cladding 12 of fluorinated polymer.

Figure 2:
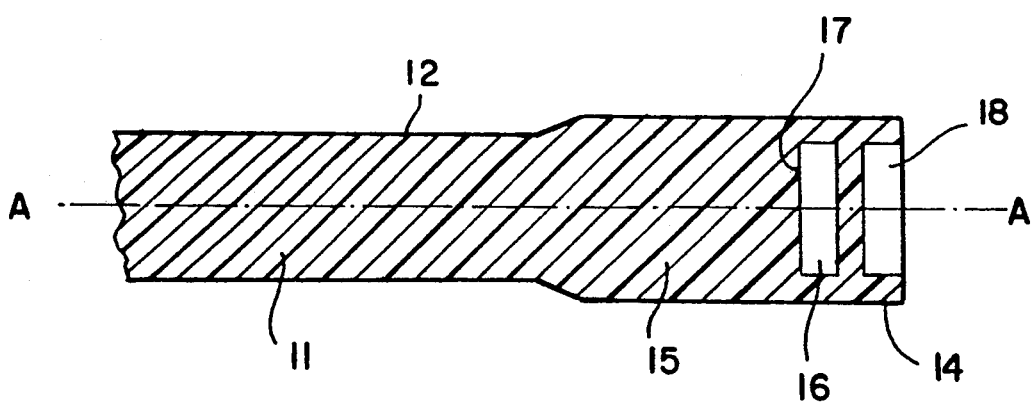
FIG. 2 is a side view in (partial) cross section of device for transmitting and returning light of FIG. 1 as would be seen if the cross section were taken along line 2—2 in FIG. 1.

FIG. 2 is a side view in (partial) cross section of device for transmitting and returning light 10 of FIG. 1 as would be seen if the cross section were taken along line 2—2 in FIG. 1. A returner 16, i.e. a mirror, light emitter e.g. fluorescent, absorber, reflector, scattering, gas permeable, or a combination thereof, or the like preferably shaped and sized to fit the second end 14 and with a face 17 positioned for returning a substantial portion of the light transmitted through the elongate light transmissive member 11. The returner 16 is in the preferred embodiment a piece of medical grade stainless steel polished to be an excellent reflector. The returner 16 is stamped to make a circular disc from a thin sheet of such metal and so has a melting point which is substantially higher than the elongate light transmissive member 11. The returner 16 is disposed with its face 17 normal to the axis "A" and the returner 16 is embedded within the second end 14 to which it is applied.

In the preferred embodiment the elongate light transmissive member 11 and the returner 16 each have a substantially circular cross section with the diameter of the returner 16 about the same size as the diameter of the elongate light transmissive member 11. A holder 18, when necessary or desirable, is placed substantially parallel to the returner 16 to secure the embedded returner 16 at the second end 14 to which the returner 16 has been applied. The holder 18 terminates the second end 14 so that polymer encapsulates the returner 16 when the holder 18 completes the fiber.

Figure 3:
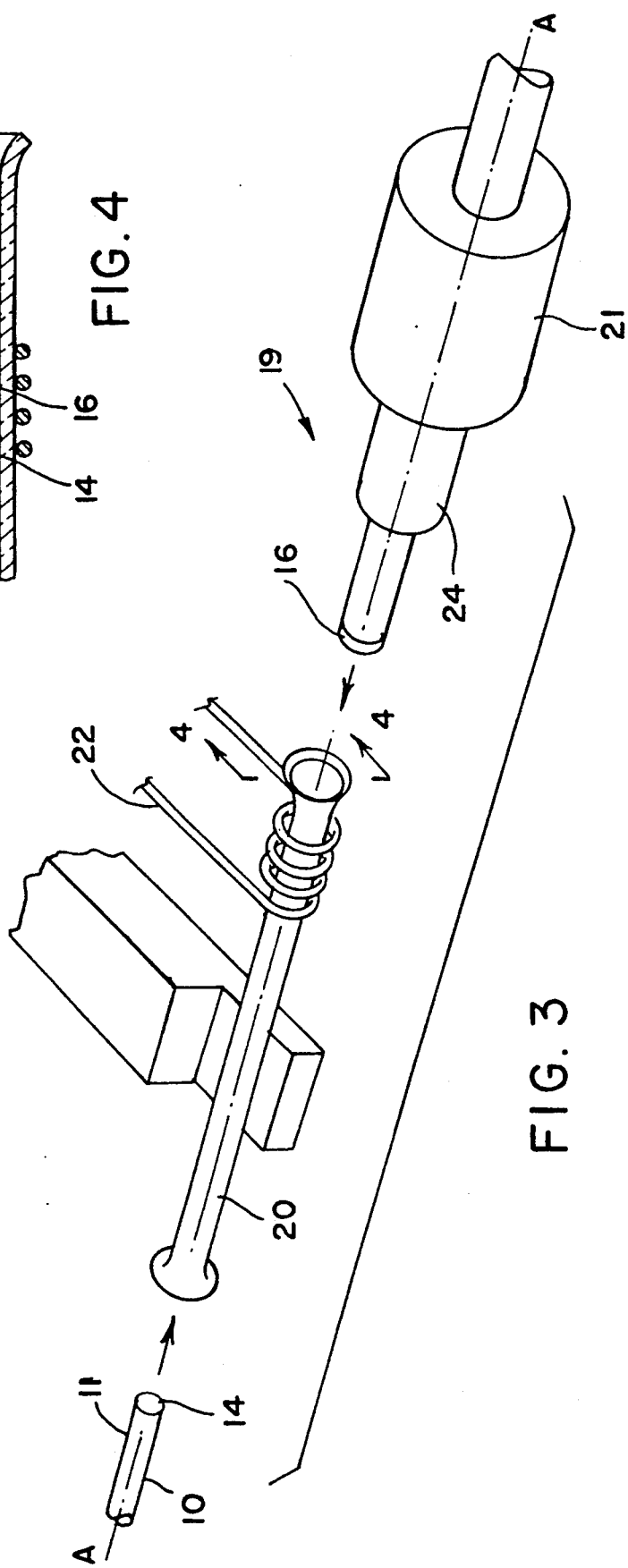
FIG. 3 is an exploded perspective view of an apparatus for the manufacturing of the returner for its assembly to the device for transmitting and returning light.

FIG. 3 is an exploded perspective view of an apparatus for the manufacturing 19 by assembly of the returner 16 into the device for transmitting and returning light 10. The apparatus for manufacturing 19 of the device for transmitting and returning light 10 preferably has a tube 20 having a cross sectional shape like the elongate light transmissive member 11. The tube 20 is positioned along the axis "A" and has a cross sectional shape similar to but internally larger than the device for transmitting and returning light 10 for permitting insertion into and removal from the device for transmitting and returning light 10 from the tube 20. The elongate light transmissive member 11 is received for telescopic conjugation within the tube 20. The tube 20 is in the preferred embodiment made of a relatively nonconductive material such as glass. The preferred cross sectional shape of tube 20 is circular.

Figure 4:
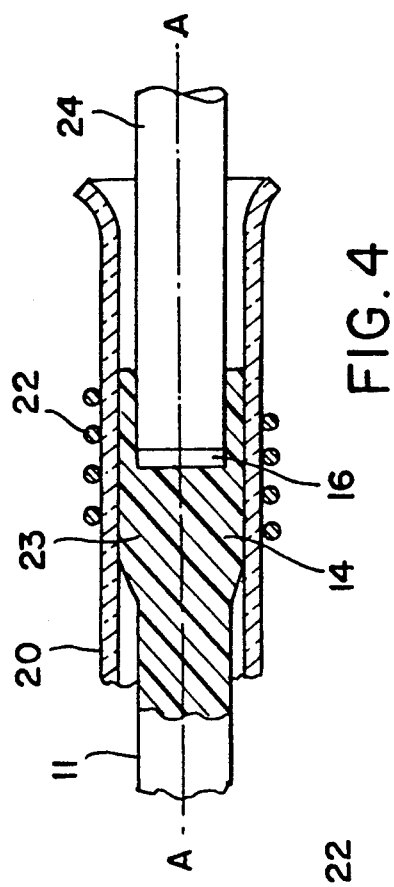
FIG. 4 is a side view in partial cross section of the apparatus of FIG. 3 as would be seen if the cross section were taken, through the tube and heater of the apparatus when in use, along line 4—4 in FIG. 3.

FIG. 4 is a side view in partial cross section of the apparatus of FIG. 3 as would be seen if the cross section were taken, through the tube 20 and a heater 22 of the apparatus for manufacturing 19 when in use assembling the returner 16 to the elongate light transmissive member 11. The apparatus for manufacturing 19 includes a means for telescopically urging 21 the elongate light transmissive member 11 and the returner 16 together while the tube 20 is coaxially about the elongate light transmissive member 11 when the returner 16 is brought against the second end 14. The heater 22 is placed about the tube 20 and the second end 14 of the elongate light transmissive member 11 and the returner 16, which are within the tube 20, thereby allows the returner 16 to, under the force of the urging, be embedded within the second end 14 without melting or deforming the tube 20. It should be noted that the second end 14 is shown in FIG. 4 with a slightly enlarged distal diameter 23 which is the direct result of the heat applied through the tube 20.

The diametrical expansion resulting from the heat also prepares the second end 14 to receive the returner 16 by softening the polymer. A vacuum pickup 24 aligned along axis "A", is inserted into tube 20 with returner 16 held by differential air pressure on the end thereof that faces second end 14. While a specific mechanism is not specifically shown and although the means for telescopically urging 21 is illustrated as associated with the vacuum pickup 24, it should be appreciated that the means for telescopically urging 21 the elongate light transmissive member 11 and the returner 16 together can employ a pressure sensitive drive applied against either the elongate light transmissive member 11, the returner 16 or both. Consequently, the heated second end 14 and the face 17 of the returner 16 are pressed against each other to embed the returner 16 in the second end 14.

FIG. 5 is an exploded perspective view of an apparatus for the application 25 of the holder 18 during the manufacture of the device for transmitting and returning light 10. In this description where similar components are shown the reference numbering used will be the same throughout, e.g. in FIG. 5 there is shown vacuum pickup 24, means for telescopically urging 21 and tube 20. It will be noted that the apparatus for the application 25 of the holder 18 is different as shown in FIG. 5 wherein the placement of heater 22 is about the vacuum pickup 24. The vacuum pickup 24 in axial alignment with axis "A" inserts the holder 18 into the tube 20 as shown in FIG. 6 which is a side view in partial cross section taken along the line 6—6 of FIG. 5. Therein it is shown that the tube 20, vacuum pickup 24 and the heater 22 are in line on axis "A" during assembly of the holder 18 to the elongate light transmissive member 11.

The holder 18 is placed substantially parallel to the embedded returner 16 to secure the embedded returner 16 at the second end 14. The holder 18 terminates the second end 14 and encapsulates the returner 16 when the holder 18 completes the elongate light transmissive member 11.

A method for manufacturing the device for transmitting and returning light 10 may include the step of placing the tube 20 having a cross sectional shape like that of the elongate light transmissive member 11 along the axis "A". The larger internal diameter of the tube 20 permits insertion and removal of the device for transmitting and returning light 11 from the tube 20 before and after manufacture. The tube 20 receives the elongate light transmissive member 11 for telescopic conjugation therewithin.

The method may also include the steps of aligning the returner 16 along the axis "A" substantially with its face 17 normal thereto for placement upon the second end 14 of the elongate light transmissive member 11. Followed by the step of urging the elongate light transmissive member 11 and the returner 16 together with the tube 20 coaxially about the elongate light transmissive member 11 during placement of the returner 16 against the second end 14. The step of heating the tube 20, the elongate light transmissive member 11 and the returner 16 embeds the returner 16 within the second end 14 without melting or deforming the tube 20. Applying the holder 18 with a heated vacuum pickup 20 to the second end 14 secures the returner 16.

What is claimed is:

1. A device for transmitting and returning light comprising:
    an elongate light transmissive member having an axis along the longitude thereof, which elongate light transmissive member is a flexible polymer fiber having first and second ends substantially normal to the axis for passing light therebetween, and
    a returner shaped and sized to fit the second end with a face positioned for returning light transmitted through the elongate light transmissive member, the face disposed substantially normal to the axis and embedded within the second end.

2. A device according to claim 1 wherein a holder is placed substantially parallel to the returner to securely encapsulate the embedded returner at the second end and the holder terminates the second end so that the polymer encapsulates the returner to complete the second end.

3. A device according to claim 1 wherein the flexible polymer fiber is a clad fiber.

4. A device according to claim 3 wherein the clad fiber has a core of polymethylmethacrylate polymer and a cladding of fluorinated polymer.

5. A device according to claim 4 wherein the clad fiber and the returner each have a substantially circular cross section with the diameter of the returner being substantially equal to that of the diameter of the clad fiber and the returner is embedded a distance about 1 to 2 diameters from the second end.

6. A device according to claim 5 wherein the returner has a melting point substantially higher than the melting point of the clad fiber.

7. A method for manufacturing a device for transmitting and returning light, which device comprises an elongate light transmissive flexible member having an axis along the longitude thereof, which elongate light transmissive member is a flexible polymer fiber having first and second ends substantially normal to the axis for passing light therebetween; and a returner shaped and sized to fit the second end with a face positioned for returning the light transmitted through the elongate light transmissive member, which returner has a melting point substantially higher than the melting point of the elongate light transmissive member, the face being disposed substantially normal to the axis and embedded within the second and, which method comprises the following steps:
    placing a tube having a cross sectional shape similar to that of the elongate light transmissive member 11 along the axis, the tube being sized to receive the elongate light transmissive member for telescopic conjugation therewithin;
    aligning the returner along the axis with its face substantially normal thereto for placement upon the second end of the elongate light transmissive member;
    telescopically urging the tube, the elongate light transmissive member and the returner with the tube coaxially about the elongate light transmissive member and with the returner against the second end;
    heating the tube, the elongate light transmissive member and the returner, and
    embedding the returner within the second end without melting or deforming the tube.

8. A method according to claim 7 including the added step of aligning a holder along the axis substantially normal thereto for placement on the second end of the elongate light transmissive member and near the returner but distal thereof;
    telescopically urging the tube, the elongate light transmissive member with the returner in the tube coaxially thereabout against the second end;
    heating a vacuum pick up for the holder to complete the device for transmitting and returning light, and securing the holder with a vacuum tube and applying the holder to the second end.

9. An apparatus for manufacturing a device for transmitting and returning light, which device comprises an elongate light transmissive flexible member with an axis along the longitude thereof, which elongate light transmissive member is aa flexible polymer fiber having first and second ends substantially normal to the axis for passing light therebetween, a returner shaped and sized to fit the second end with a face positioned for returning a substantial portion of the light transmitted through the elongate light transmissive member, the returner having a melting point substantially higher than the melting point of the elongate light transmissive member, the face disposed substantially normal to the axis and embedded within the second end, the elongate light transmissive member and the returner having cross sections of a similar size, and a holder placed substantially parallel to the returner to secure the embedded returner at the second end; which apparatus, comprises:
    a tube having a cross sectional shape similar to that of the elongate light transmissive member positioned along the axis, the tube being sized to receive the elongate light transmissive member for telescopic conjugation therewithin;
    means for aligning the face along the axis substantially normal thereto for placement upon the second end of the elongate light transmissive member;
    means for telescopically urging the tube, the elongate light transmissive member and the returner with the tube coaxially about the elongate light transmissive member and with the returner against the second end; and a heater placed about the tube, the elongate light transmissive member and the returner thereby allowing the returner to be embedded within the second end without melting or deforming the tube.

10. An apparatus according to claim 9 wherein the tube has an internal cross section larger than the cross-section of the device for transmitting and returning light for permitting removal of the device from the tube.

11. An apparatus according to claim 9 wherein the tube is made of a relatively nonconductive material.

12. An apparatus according to claim 9 wherein the tube is circular in cross section.

* * * * *